United States Patent
King et al.

(10) Patent No.: US 10,196,900 B2
(45) Date of Patent: Feb. 5, 2019

(54) HEAT TRANSFER PEDESTALS WITH FLOW GUIDE FEATURES

(71) Applicant: United Technologies Corporation, Farmington, CT (US)

(72) Inventors: Christopher King, Bristol, CT (US); San Quach, East Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 494 days.

(21) Appl. No.: 14/882,899

(22) Filed: Oct. 14, 2015

(65) Prior Publication Data

US 2016/0169000 A1    Jun. 16, 2016

Related U.S. Application Data

(60) Provisional application No. 62/091,881, filed on Dec. 15, 2014.

(51) Int. Cl.
| | |
|---|---|
| *F01D 5/18* | (2006.01) |
| *F23R 3/00* | (2006.01) |
| *F01D 9/02* | (2006.01) |
| *F01D 25/12* | (2006.01) |
| *B23P 19/00* | (2006.01) |

(52) U.S. Cl.
CPC .............. *F01D 5/186* (2013.01); *B23P 19/00* (2013.01); *F01D 5/18* (2013.01); *F01D 9/02* (2013.01); *F01D 25/12* (2013.01); *F23R 3/002* (2013.01); *F05D 2260/221* (2013.01); *F23R 2900/03045* (2013.01); *Y02T 50/676* (2013.01)

(58) Field of Classification Search
CPC .............. F01D 5/187; F05D 2240/126; F05D 2240/127
See application file for complete search history.

(56) References Cited

U.S. PATENT DOCUMENTS

| | | | | |
|---|---|---|---|---|
| 4,407,632 A | * | 10/1983 | Liang | F01D 5/187 415/115 |
| 5,695,321 A | | 12/1997 | Kercher | |
| 5,772,397 A | * | 6/1998 | Morris | F01D 5/187 415/115 |
| 6,514,042 B2 | * | 2/2003 | Kvasnak | F01D 5/187 415/115 |
| 7,938,624 B2 | * | 5/2011 | Tibbott | F01D 5/187 415/115 |

(Continued)

FOREIGN PATENT DOCUMENTS

EP    0945595 A2    9/1999

OTHER PUBLICATIONS

European Search Report for Application No. 15190037.0-1610; dated Apr. 28, 2016; 9 pgs.

*Primary Examiner* — Ninh H. Nguyen
*Assistant Examiner* — Jason G Davis
(74) *Attorney, Agent, or Firm* — Cantor Colburn LLP (57) ABSTRACT

A turbomachine component includes a body defining an interior cooling channel in fluid communication with the exterior of the body for fluid communication with a cooling flow source. At least one flow modifying pedestal is disposed within the interior cooling channel extending in a first direction. The flow modifying pedestal includes at least one flow feature that extends from the pedestal in a second direction.

19 Claims, 7 Drawing Sheets

(56) References Cited

U.S. PATENT DOCUMENTS

| | | | |
|---|---|---|---|
| 9,297,261 B2 * | 3/2016 | Otero | F01D 5/187 |
| 9,500,093 B2 * | 11/2016 | Papple | F01D 5/187 |
| 2008/0063524 A1 | 3/2008 | Tibbott | |
| 2011/0033312 A1 | 2/2011 | Lee et al. | |
| 2013/0280092 A1 | 10/2013 | Xu | |

* cited by examiner

Flow

HEAT TRANSFER PEDESTALS WITH FLOW GUIDE FEATURES

CROSS REFERENCE TO RELATED APPLICATIONS

This application claims the benefit of U.S. Provisional Patent Application Ser. No. 62/091,881 filed Dec. 15, 2014, the entire contents of which are incorporated herein by reference thereto.

STATEMENT OF GOVERNMENT RIGHTS

This invention was made with government support under Navy Fuel Burn Reduction Contract Number N68335-13-C-0005 awarded by the Navy. The government has certain rights in the invention.

BACKGROUND

1. Field

The present disclosure relates to turbomachinery components with cooling channels, more specifically to pedestals disposed within the cooling channels of the turbomachine components.

2. Description of Related Art

Certain turbomachinery components (e.g. turbine blades, compressor blades, turbine vanes, compressor vanes, blade outer air seals, combustor panels, etc.) include cooling channels defined therein for passing a cooling airflow through the interior of the components and to cooling holes defined in the component. These cooling channels can include cylindrical pedestals defined therein which add structural support and increase thermal conductivity between the outer surfaces of the component and the cooling flow passing therethrough.

Such conventional methods and systems have generally been considered satisfactory for their intended purpose. However, there is still a need in the art for improved turbomachine components with enhanced cooling. The present disclosure provides a solution for this need.

SUMMARY

A turbomachine component includes a body defining an interior cooling channel in fluid communication with the exterior of the body for fluid communication with a cooling flow source. At least one flow modifying pedestal is disposed within the interior cooling channel extending in a first direction. The flow modifying pedestal includes at least one flow feature that extends from the pedestal in a second direction.

The flow feature can include a flow guide angled to guide flow within the channel toward at least one inner surface of the body that defines the interior cooling channel. The flow feature can include a flow guide angled to guide flow within the channel toward two or more inner surfaces of the body that define the interior cooling channel.

The flow feature can include a turbulence feature extending into a flow path to mix the cooling flow within the interior channel. The first and second directions can be perpendicular and/or angled to each other.

The flow feature can include a ramp shape in cross-section. It is also contemplated that the flow feature can include a diamond shape in cross section, a cylindrical shape in cross- section, an elliptical cross-sectional shape, or any other suitable cross-sectional shape. Each flow modifying pedestal can include a plurality of flow features.

The flow modifying pedestals can include a rounded diamond cross-sectional shape, a cylindrical cross-sectional shape, or any other suitable cross-sectional shape. A method of manufacturing a turbomachine component includes forming at least one flow modifying pedestal disposed extending in a first direction within an interior cooling channel of a turbomachine component such that the flow modifying pedestal includes at least one flow feature extending from a pedestal in a second direction.

Forming can include forming the flow feature such that it includes a flow guide to guide flow within the channel toward at least one inner surface of the body that defines the interior cooling channel. In certain embodiments, forming can include forming the flow feature such that it includes a flow guide to guide flow within the channel toward two or more inner surfaces of the body that define the interior cooling channel.

Forming can include forming the flow feature such that it includes a turbulence feature to mix the cooling flow within the interior channel. In certain embodiments, forming can include forming the flow feature such that the second direction is perpendicular and/or angled to the first direction. Forming can include additive manufacturing, casting, laser cutting, and/or electrical discharge machining These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a turbomachine component (e.g., an airfoil) in accordance with the disclosure is shown in FIG. 2A and is designated generally by reference character 200. Other embodiments and/or aspects thereof are shown in FIGS. 1 and 2B-8. The systems and methods described herein can be used to enhance cooling efficiency in components.

Figure 1:
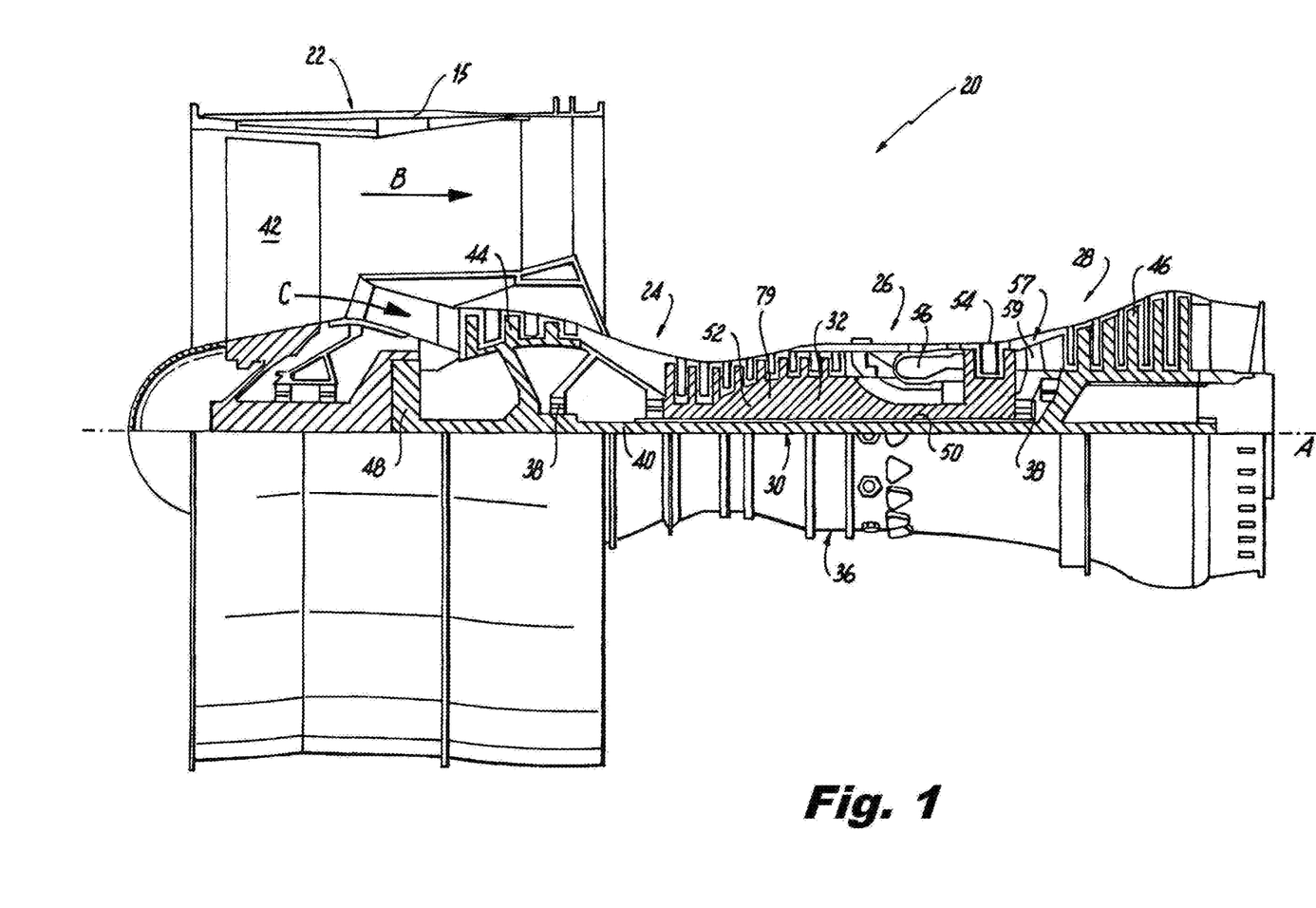
FIG. 1 is a partial cross-sectional side elevation view of a turbomachine in accordance with this disclosure, showing various features of the turbomachine.
Figure 2A:
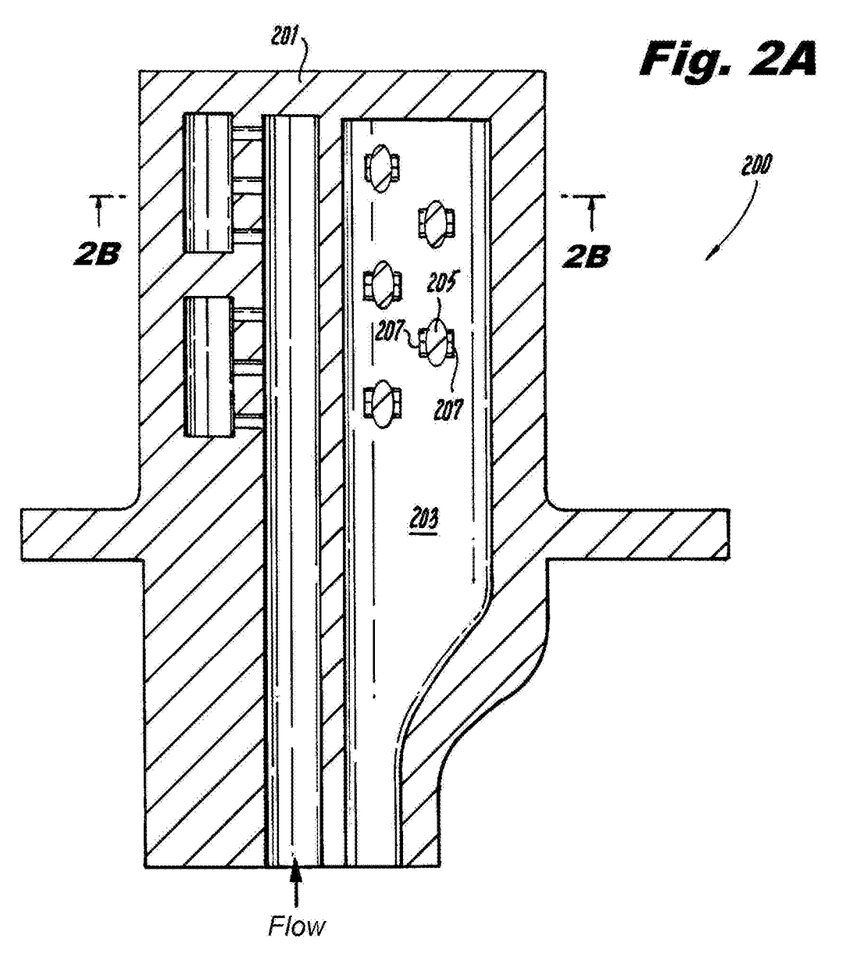
FIG. 2A is a cross-sectional side elevation view of a component in accordance with this disclosure, showing flow modifying pedestals disposed within a flow channel thereof.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28.

Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,^\circ R)/(518.7\,^\circ R)]^{0.5}$. The "Low corrected fan tip speed" as disclosed herein according to one non-limiting embodiment is less than about 1150 ft/second (350.5 meters/second).

Figure 2B:
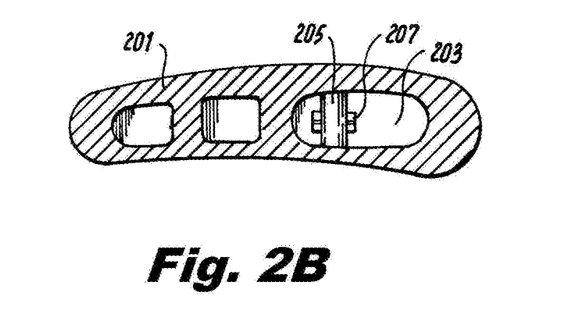
FIG. 2B is cross-sectional view of the component of FIG. 2A taken along line 2B-2B.
Figure 3A:
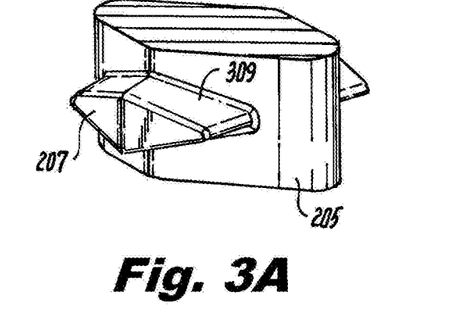
FIG. 3A is a perspective view of a flow modifying pedestal in accordance with this disclosure, shown having flow features disposed thereon.
Figure 3B:
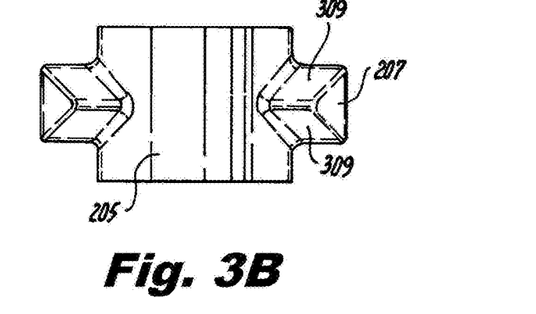
FIG. 3B is a front elevation view of the pedestal of FIG. 3A.
Figure 3C:
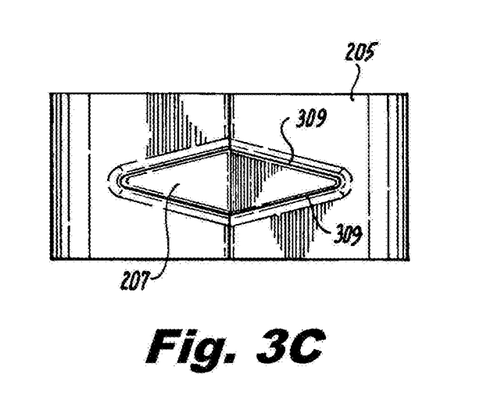
FIG. 3C is a side elevation view of the pedestal of FIG. 3A.
Figure 3D:
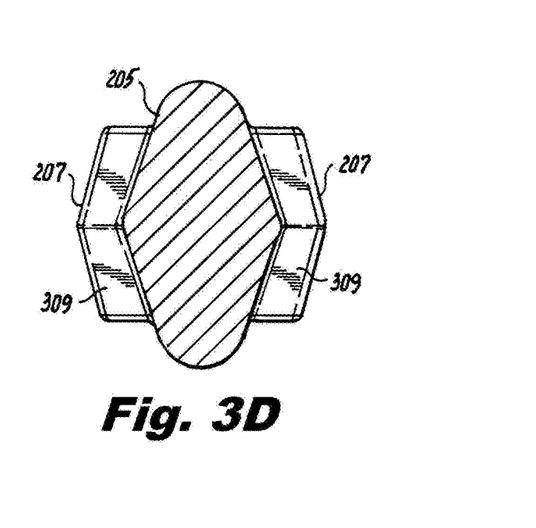
FIG. 3D is a plan view of the pedestal of FIG. 3A.

Referring to FIGS. 2A and 2B, a turbomachine component 200 includes a body 201 defining an interior cooling channel 203 in fluid communication with an exterior of the body 201 for fluid communication with a cooling flow source, e.g., connected to a bleed off of compressor section 24. At least one flow modifying pedestal 205 is disposed within the interior cooling channel 203 extending in a first direction (e.g., at least partially across the cooling channel 203). The body 201 can be any suitable turbomachine component having cooling channels (e.g., an airfoil, a BOAS, a combustor component).

The flow modifying pedestal 205 includes at least one flow feature 207 that extends from the pedestal 205 in a second direction (e.g., perpendicular or otherwise lateral therefrom). The first and second directions can be perpendicular and/or angled to each other, or can be any other suitable angle relative to each other (e.g., between about 15 degrees and about 90 degrees). The flow modifying pedestals 205 includes a rounded diamond cross-sectional shape as shown, however, it can have any other suitable shape (e.g., cylindrical). Each pedestal 205 can have one or more flow features 207 on each side.

Referring additionally to FIGS. 3A-3D, the flow feature 205 can include a flow guide 309 angled to guide flow within the channel 203 toward at least one inner surface of the body 201 that defines the interior cooling channel 203. As shown in FIGS. 3A-3D, the flow guide 309 can be angled to guide flow bidirectionally such that flow is directed toward two inner surfaces of the body 201 that define the interior cooling channel 203. For example, the flow feature 207 can include a diamond shape in cross section to define flow guide 309. This can allow cooling flow to be pushed toward the outside surface of the component 200 which allows the cooling air to impinge on the body 201 instead of flowing through the center of the cooling channel 203.

Figure 4A:
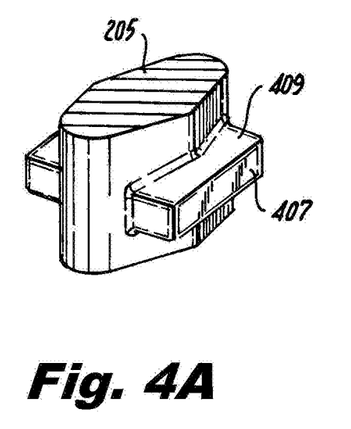
FIG. 4A is a perspective view of a flow modifying pedestal in accordance with this disclosure, shown having flow features disposed thereon.
Figure 4B:
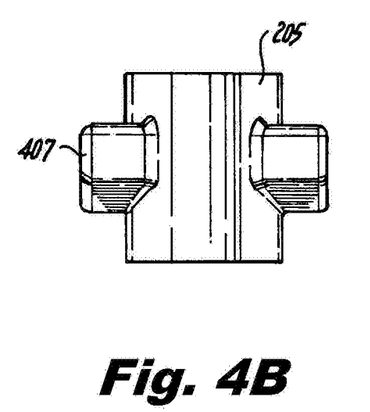
FIG. 4B is a front elevation view of the pedestal of FIG. 4A.
Figure 4C:
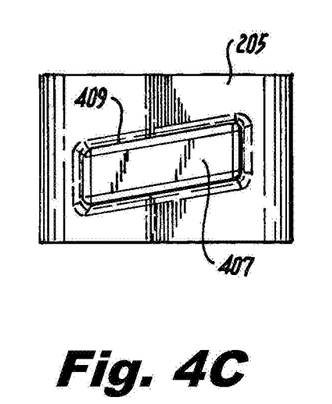
FIG. 4C is a side elevation view of the pedestal of FIG. 4A.

Referring to FIGS. 4A-4C, the pedestal 205 can include a flow feature 407 having a ramp shape in cross-section such that the flow is directed unidirectionally toward a single surface.

Figure 5A:
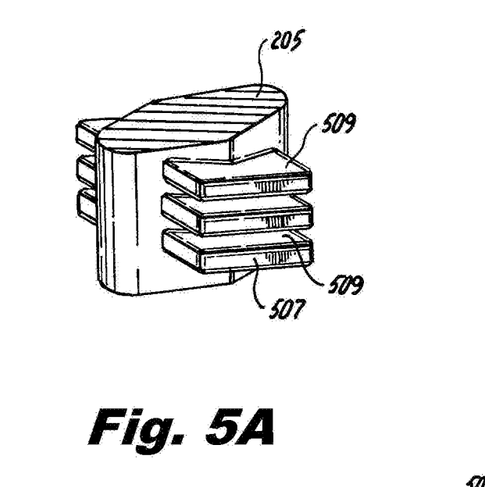
FIG. 5A is a perspective view of a flow modifying pedestal in accordance with this disclosure, shown having flow features disposed thereon.
Figure 5B:
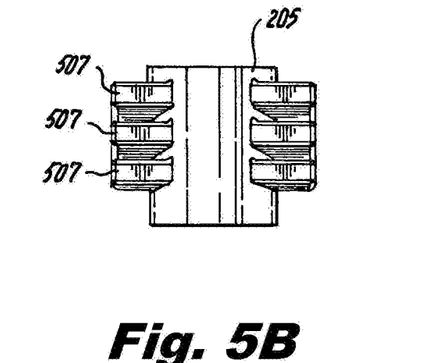
FIG. 5B is a front elevation view of the pedestal of FIG. 5A.
Figure 5C:
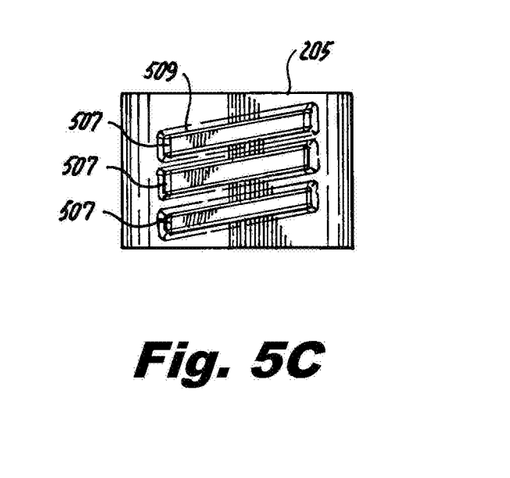
FIG. 5C is a side elevation view of the pedestal of FIG. 5A.
Figure 6A:
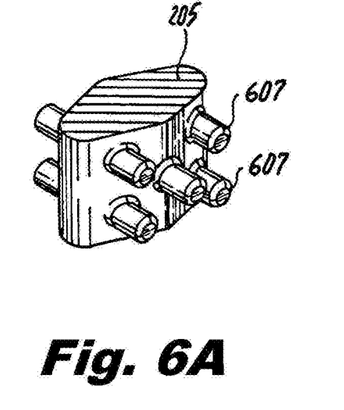
FIG. 6A is a perspective view of a flow modifying pedestal in accordance with this disclosure, shown having flow features disposed thereon.
Figure 6B:
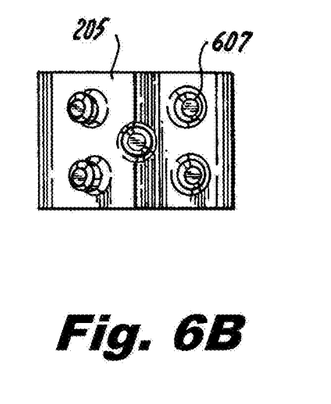
FIG. 6B is a side elevation view of the pedestal of FIG. 6A.
Figure 6C:
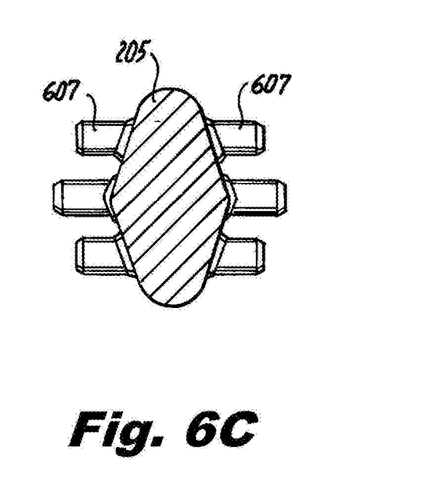
FIG. 6C is a plan view of the pedestal of FIG. 6A.
Figure 6D:
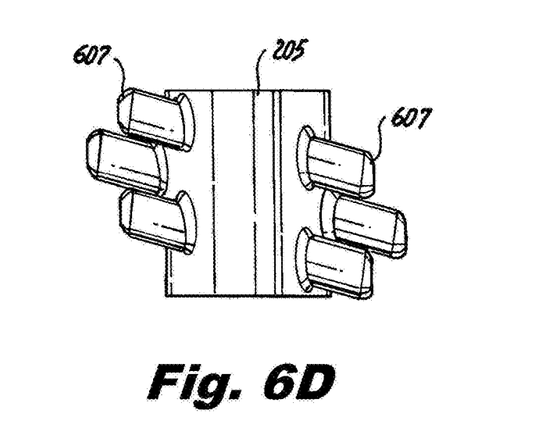
FIG. 6D is a front elevation view of the pedestal of FIG. 6A, shown having angled flow features.

Referring to FIGS. 5A-5C, the flow modifying pedestal 205 can include a plurality of flow features 507 that define ramp shaped flow guides 509.

Referring to FIGS. 6A-6D, the flow modifying pedestal 205 can include one or more flow features 607 that define a turbulence feature extending into a flow path to mix the cooling flow within the interior channel 203. In certain embodiments, as shown in FIGS. 6A-6D, the flow features 607 can include a cylindrical shape in cross-section and can be disposed in an interweaved pattern.

Figure 7A:
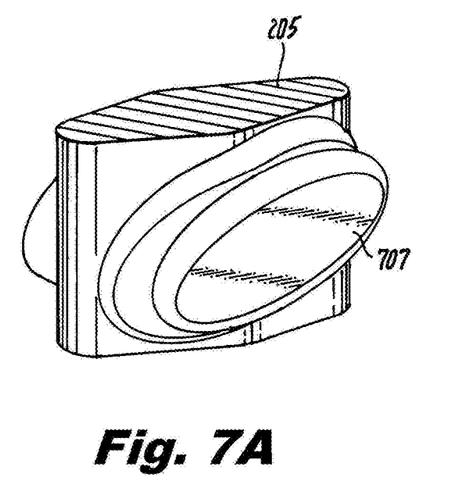
FIG. 7A is a perspective view of a flow modifying pedestal in accordance with this disclosure, shown having eliptical flow features disposed thereon.
Figure 7B:
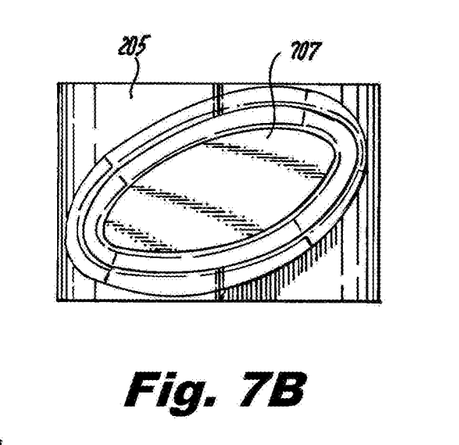
FIG. 7B is a side elevation view of the pedestal of FIG. 7A.
Figure 8:
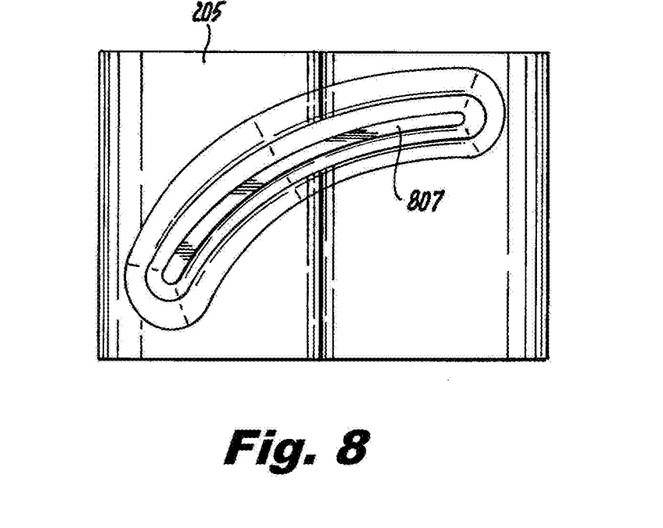
FIG. 8 is a side elevation view of a flow modifying pedestal in accordance with this disclosure, shown having a curved ramp flow feature disposed thereon.

Referring to FIGS. 7A and 7B, the pedestal 205 can include a flow feature 707 having an angled elliptical shape in cross-section such that the flow is directed unidirectionally toward a single surface. Referring to FIG. 8, the pedestal 205 can include a flow feature 807 having a curved ramp shape in cross-section (e.g., similar to a high camber airfoil) such that the flow is directed unidirectionally toward a single surface. While several embodiments of flow features have been shown, any other suitable cross-sectional shape and/or pattern to cause flow mixing and/or turbulence is contemplated herein.

A method of manufacturing a turbomachine component 200 can include forming at least one flow modifying pedestal 205 as described above. Forming can include forming a flow feature such that it includes features as described above. The component 200 can be manufactured in any suitable manner (e.g., using additive manufacturing, casting, laser cutting, electrical discharge machining).

In addition to directing flow toward the surfaces of the airfoil, the flow modifying pedestals have increased surface area which also increases thermal transfer through the pedestals. The methods and systems of the present disclosure, as described above and shown in the drawings, provide for turbomachine components with superior properties including enhanced cooling and/or thermal regulation. While the apparatus and methods of the subject disclosure have been shown and described with reference to embodiments, those skilled in the art will readily appreciate that changes and/or modifications may be made thereto without departing from the scope of the subject disclosure.

What is claimed is:

1. A turbomachine component, comprising:
   a body, wherein the body defines an interior cooling channel in fluid communication with an exterior of the body for fluid communication with a cooling flow source, the body having a first inner surface and a second inner surface that define a portion of the interior cooling channel;
   at least one flow modifying pedestal disposed within the interior cooling channel extending in a first direction across the cooling channel between the two inner surfaces; and
   a first flow feature on a first side of the at least one flow modifying pedestal that extends from the pedestal in a second direction, the first flow feature configured to direct a flow of air toward the first inner surface, and
   a second flow feature on a second side of the at least one flow modifying pedestal that extends in the second direction, opposite the direction of the first flow feature, the second flow feature configured to direct a flow of air toward the second inner surface,
   wherein the at least one flow modifying pedestal, the first flow feature, and the second flow feature are configured to push a cooling flow of air toward the first and second inner surfaces.

2. The component of claim 1, wherein at least one of the first flow feature and the second flow feature includes a flow guide angled to guide flow within the channel toward a respective inner surface.

3. The component of claim 1, wherein each flow feature includes a flow guide angled to guide flow within the channel toward the respective inner surfaces.

4. The component of claim 1, wherein each flow feature is a turbulence feature extending into a flow path to mix the cooling flow within the interior channel.

5. The component of claim 1, wherein the first and second directions are perpendicular or angled to each other.

6. The component of claim 5, wherein each flow feature has a ramp shape in cross-section.

7. The component of claim 5, wherein each flow feature has a diamond shape in cross section.

8. The component of claim 5, wherein each flow feature has a cylindrical or elliptical shape in cross-section.

9. The component of claim 5, wherein each flow modifying pedestal includes a plurality of first flow features on the first side and a plurality of second flow features on the second side.

10. The component of claim 1, wherein the flow modifying pedestals have a rounded diamond cross-sectional shape.

11. The component of claim 1, wherein the flow modifying pedestals have a cylindrical or elliptical cross-sectional shape.

12. A method of manufacturing a turbomachine component, comprising:
    forming at least one flow modifying pedestal within an interior cooling channel of a turbomachine component, each flow modifying pedestal disposed extending in a first direction within the channel, each flow modifying pedestal extending across the cooling channel between a first inner surface and a second inner surface of the component that define the interior cooling channel; and forming a first flow feature on a first side of each flow modifying pedestal and a second flow feature on a second side of each flow modifying pedestal, wherein the first flow feature extends from the first side of a respective pedestal in a second direction and the second flow feature extends from the second side of the respective pedestal in the second direction, opposite the direction of the first flow feature; wherein forming includes forming at least one of the first flow feature and the second flow feature such that it includes a flow guide to guide flow within the channel toward the respective inner surface.

13. The method of claim 12, wherein forming includes forming each flow feature such that it includes a flow guide to guide flow within the channel toward the respective inner surfaces.

14. The method of claim 12, wherein forming includes forming each flow feature as a turbulence feature to mix the cooling flow within the interior channel.

15. The method of claim 12, wherein forming includes forming each flow feature such that the second direction is perpendicular or angled to the first direction.

16. The method of claim 15, wherein forming includes forming each flow feature such that it has a ramp shape in cross-section.

17. The method of claim 15, wherein forming includes forming each flow feature such that it has a diamond shape in cross-section.

18. The method of claim 15, wherein forming includes forming each flow feature such that it has a cylindrical or elliptical shape in cross-section.

19. The method of claim 12, wherein forming includes additive manufacturing, casting, laser cutting, and/or electrical discharge machining.

* * * * *